United States Patent [19]

Nakamura et al.

[11] Patent Number: 4,840,446
[45] Date of Patent: Jun. 20, 1989

[54] PHOTO SEMICONDUCTOR DEVICE HAVING A MULTI-QUANTUM WELL STRUCTURE

[75] Inventors: Hitoshi Nakamura, Kanagawa; Shinji Sakano, Hachiouji; Hiroaki Inoue; Toshio Katsuyama, both of Hachiouji; Hiroyoshi Matsumura, Saitama, all of Japan

[73] Assignees: Hitachi Cable, Ltd.; Hitachi, Ltd., both of Tokyo, Japan

[21] Appl. No.: 94,601

[22] Filed: Sep. 9, 1987

[30] Foreign Application Priority Data

Sep. 16, 1986 [JP] Japan ................. 61-215806

[51] Int. Cl.$^4$ ................................. G02F 1/15
[52] U.S. Cl. .................. 350/96.13; 350/96.14; 350/355; 357/17; 357/30
[58] Field of Search ............ 350/96.11, 96.12, 96.13, 350/96.14, 96.15, 354, 355, 356; 357/16, 17, 19, 30, 4; 332/7.51

[56] References Cited

U.S. PATENT DOCUMENTS

| | | | |
|---|---|---|---|
| 3,246,159 | 4/1966 | Pankove | 350/1.2 |
| 4,594,718 | 6/1986 | Scifres et al. | 357/17 X |
| 4,705,361 | 11/1987 | Frazier et al. | 350/355 |
| 4,716,449 | 12/1987 | Miller | 357/30 |
| 4,727,557 | 2/1988 | Burnham et al. | 357/17 X |
| 4,737,003 | 4/1988 | Matsumura et al. | 350/96.14 |
| 4,742,378 | 5/1988 | Ito et al. | 357/17 |
| 4,746,181 | 5/1988 | Hayakawa et al. | 350/96.12 |

Primary Examiner—John D. Lee
Attorney, Agent, or Firm—Antonelli, Terry & Wands

[57] ABSTRACT

A multi-quantum well structure which is formed by laminating thin semiconductor layers is provided with means for injecting carriers in a direction which is parallel to the surface of the laminated thin semiconductor layers, whereby it is possible to obtain satisfactory changes in refractive index of the carrier injection portion. For example, if the total reflection region of an optical switch consisting of optical waveguides which cross each other is provided with a multi-quantum well structure wherein carriers are injected in a direction parallel to the surface of the well, the extinction ratio characteristics of the device can be improved.

10 Claims, 4 Drawing Sheets

PHOTO SEMICONDUCTOR DEVICE HAVING A MULTI-QUANTUM WELL STRUCTURE

BACKGROUND OF THE INVENTION

The present invention relates to photo semiconductor devices having a structure which enables changes in refractive index of a desired portion and, more specifically, to photo semiconductor devices such as an optical modulator and an optical switch. More particularly, the present invention pertains to a photo semiconductor device which may suitably be applied to an optical integration element, optical switchboard, or the like.

It is described in detail in Japanese Patent Laid-Open No. 134219/1985 and its corresponding European Patent Laid-Open No. 0147195 that a change in refractive index which results from injection of carriers into a semiconductor material is larger than a refractive index change caused by the electro-optic effect or the like and threrefore applicable to optical switches or the like.

Since the refractive index change by carrier injection is estimated to be greater in the case of the multi-quantum well (MQW) structure than that in the case of the bulky crystal structure, a combination of these techniques theoretically enables attainment of a photo semiconductor device which is operable at high efficiency, for example, a low threshold semiconductor laser, high-efficiency optical modulator or optical switch.

In the above-described prior art, carriers are injected into thin semiconductor layers which constitute the MQW structure in a direction perpendicular to the surface of the semiconductor layers. The MQW structure is formed by alternately laminating a well layer and a barrier layer. Therefore, when carriers are injected perpendicularly to the surface of the MQW structure, the injected carriers move while being obstructed by the barrier layers and successively fill the well layers from those which are closer to the carrier injection side. Substantially no carriers reach the well layers which are 0.1 to 0.2 μm or more away from the carrier injection side. Accordingly, when there is a need for an optical waveguide (including all the MQW layers) having a relatively large thickness, e.g., 5 μm or more, in the case, for example, of a large-output laser, optical modulator or optical switch, a considerably small amount of carriers is injected into the well layers which are 0.1 to 0.2 μm or more away from the carrier injection side, so that effects caused by carrier injection, for example, changes in the refractive index, are unsatisfactory in these well layers. Therefore, it is impossible to expect satisfactory improvements in the characteristics of a photo semiconductor device, for example, extinction ratio.

SUMMARY OF THE INVENTION

It is a primary object of the present invention to provide a photo semiconductor device having a structure in which carriers are satisfactorily injected throughout the semiconductor layers which constitute in combination a multi-quantum well structure.

The above-described object can be attained by a structure in which carriers are injected in a direction parallel to the surface of the laminated semiconductor layers which constitute a multi-quantum well structure. In this case, regions for carrier injection are formed on side surfaces, respectively, of the multi-quantum well structure, that is, the side surfaces which are perpendicular to the surface of the multilayer film which constitutes the quantum well.

More specifically, the present invention provides, in a semiconductor device which has a multi-quantum well (MQW) structure formed by laminating thin semiconductor layers on a semiconductor substrate and which operates in accordance with changes in refractive index caused by variations in the number of carriers in the region of the multi-quantum well structure, a photo semiconductor device which comprises means for injecting the carriers into the multi-quantum well structure region in a direction parallel to the surface of the laminated thin semiconductor layers constituting the multi-quantum well structure.

If carriers are injected parallel to the surface of the multilayer film which constitutes a multi-quantum well structure as described above, the carriers are efficiently injected into all the well layers without being affected by two-dimensional potential barriers within the multi-quantum well structure. In addition, there is no lowering in the injection efficiency even if the thickness of the multi-quantum well structure region is increased or the number of multi-quantum well layers is increased.

BRIEF DESCRIPTION OF THE DRAWINGS

FIG. 1b is a sectional view of the optical switch taken along the line A—A' of FIG. 1a;

DESCRIPTION OF THE PREFERRED EMBODIMENTS

Figure 1A:
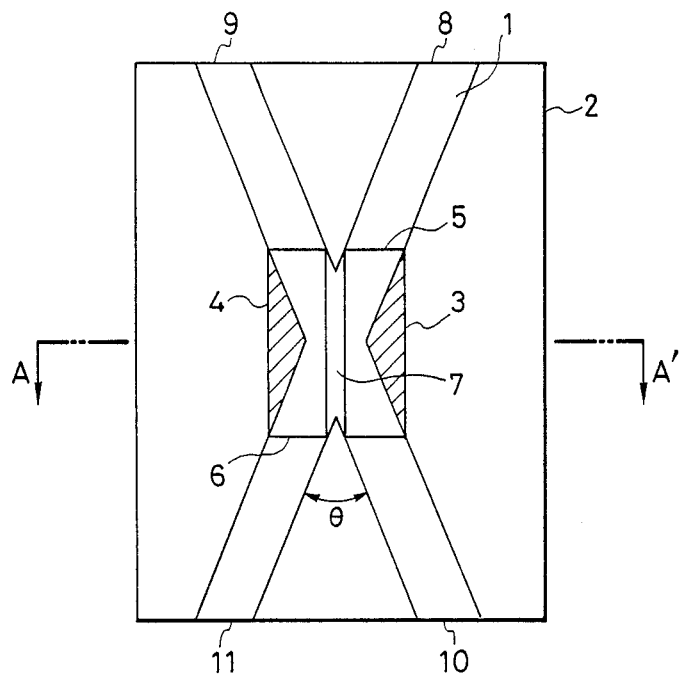
FIG. 1a is a plan view of an optical switch in accordance with one embodiment of the present invention.
Figure 1B:
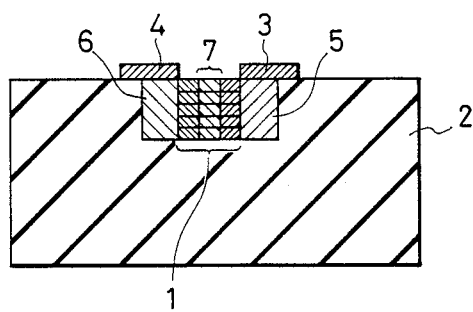
Figure 1C:
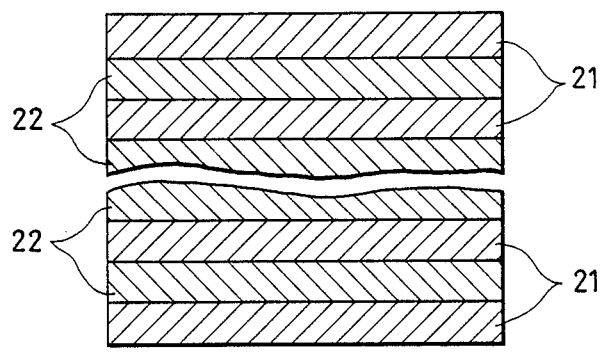
FIG. 1c is an enlarged sectional view of the multi-quantum well portion of the optical switch shown in FIG. 1a before the diffusion step.

Embodiment 1:

One example of the optical switch according to the present invention will be described hereinunder with reference to FIGS. 1a to 1d. As shown in FIG. 1a, the optical switch in accordance with this embodiment is of the total reflection 2×2 cross over type. An optical waveguide 1 has an InP/InGaAsP multi-quantum well structure (also known as "super lattice") and is buried in a semi-insulative InP substrate 2 having an X-shaped channel stripe. The multi-quantum well structure is, as shown in FIG. 1c, composed of barrier layers 21 made of InP ($n=5\times10^{15}$ cm$^{-3}$) and having a film thickness of 50 Å and layers 22 made of n-InGaAsP ($n=5\times10^{15}$ cm$^{-3}$) and having a bandgap wavelength of 1.3 μm and a film thickness of 100 Å, and the total film thickness of the well structure is 0.7 μm. FIG. 1b is a sectional view taken along the line A—A' of FIG. 1a. Injection of carries into a refractive index change region (reflection region) 7 at the waveguide intersection is effected through triangular p- and n-electrodes 3 and 4. In order to effect injection of carriers into the region 7, Be and Si are respectively implanted into square regions 5 and 6 including the waveguide and the substrate to form a p-region having a carrier concentration of $1 \times 10^{18}$ cm$^{-3}$ and an n-region having a carrier concentration of $1 \times 10^{18}$ cm$^{-3}$. The carrier concentrations in these regions may be selected so as to fall within the carrier concentration range which is generally employed for carrier injection and it is common practice to set the carrier concentrations at $1 \times 10^{17}$ to $1 \times 10^{19}$ cm$^{-3}$. The width of the waveguide and the angle $\theta$ of the waveguide intersection are set at, for example, 8 μm and 10°, respectively, and the width of the carrier injection region 7 is set at, for example, 2 μm. The reflection region or carrier injection region 7 is lowered in terms of refractive index by injection of carriers, and the width of this region is preferably selected so as to fall within the range from 2 to 5 μm. A width less than 2 μm results in unsatisfactory reflection of light, while a width in excess of 5 μm undesirably narrows the passage of reflected light.

As a material for the substrate 2, InP or GaAs is generally employed. In the case of an InP substrate, InP, InGaAs, InGaAsP, InGaAlAs, InAlAs or the like is employed as a material for the MQW, whereas, in the case of a GaAs substrate, GaAlAs, GaAs or the like is employed as a material for the MQW.

Each of the layers which constitute the multi-quantum well structure is an undoped layer, and the n- or p-type carrier concentration thereof is from $1 \times 10^{14}$ to $1 \times 10^{17}$ cm$^{-3}$. The reason why the layers are not doped intentionally is to reduce the loss of light within the waveguide by carriers.

The process for producing this embodiment is as follows:

(1) An X-shaped channel is formed in a substrate by a known wet etching method using a hydrochloric acid etching liquid.

(2) Semiconductor layers which constitute in combination a multi-quantum well structure are formed by the MOCVD (organometallic chemical vapor deposition) method.

(3) The multi-quantum well layers other than those which are within the waveguide are removed by an ordinary photolithographic method using a sulfuric acid etching liquid.

(4) Be and Si are selectively implanted into the regions 5 and 6, respectively, by ion implanation, (5) Annealing is carried out using an infrared lamp.

(6) The p-electrode (consisting of a double layer of Cr and Ar) 3 and an n-electrode (consisting of a triple layer of AuGeNi, Pd and Au) 4 are formed by resistance heating evaporation.

Light having a wavelength of 1.3 μm was applied to the optical switch obtained by the above-described process from the input end 8 to measure the device characteristics. When no current was supplied to the electrodes 3 and 4, the ratio of rays of light emerging from the output ends 10 and 11, respectively, i.e., $P_{10}/P_{11}$, was about 15 dB. As a forward current was supplied and increased, the ratio $P_{10}/P_{11}$ decreased, and saturation was substantially reached when the current value was 30 mA. The extinction ratio $P_{10}/P_{11}$ at that time was about −20 dB. When light was applied from the other input end 9 also, characteristics similar to the above were obtained.

Figure 1D:
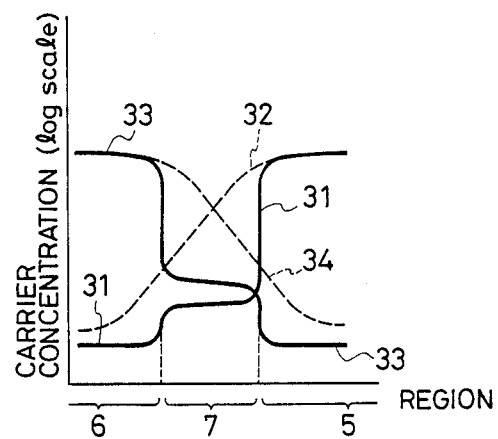
FIG. 1d is a graph showing carrier concentration distributions in the optical switch shown in FIG. 1a before and after the carrier injection.

As described above, that portion of the photo semiconductor device according to the present invention which changes the refractive index has a p-i-n structure (in FIGS. 1a and 1b, the p-, i- and n-regions are denotd by 5, 7 and 6, respectively), and when this structure is forwardly biased, the carrier concentration in the i-region 7 changes most noticeably as shown in FIG. 1d. In FIG. 1d, the curve 31 represents the electron concentration before the injection of carriers, the curve 32 the electron concentration after the carrier injection, the curve 33 the hole concentration before the carrier injection, and the curve 34 the hole concentration after the carrier injection. It should be noted that the change in refractive index caused by doping is generally smaller than the change in refractive index by carrier injection or a change in composition.

Although in the above-described embodiment the whole of the optical waveguide is constituted by the multi-quantum well, it is also possible to dispose a multi-quantum well structure only in the total reflection region and form the optical waveguide portion other than the total reflection region using a single layer (e.g., the InGaAsP layer in the above case) of a material having a higher refractive index than that of the clad (including the substrate).

Although in this embodiment InP/InGaAsP is employed as a material for the waveguide formed using a multi-quantum well, it is also possible to employ InP/InGaAs, InP/InGaAlAs, InAlAs/InGaAs, GaSb/GaAlSb, GaAs/GaAlAs, or the like.

Figure 2:
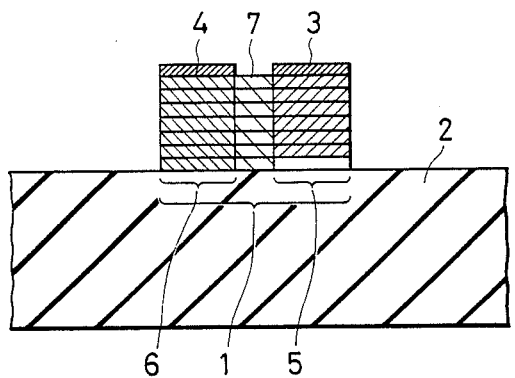
FIGS. 2, 3 and 4 are sectional views respectively showing optical switches in accordance with other embodiments of the present invention.
Figure 3:
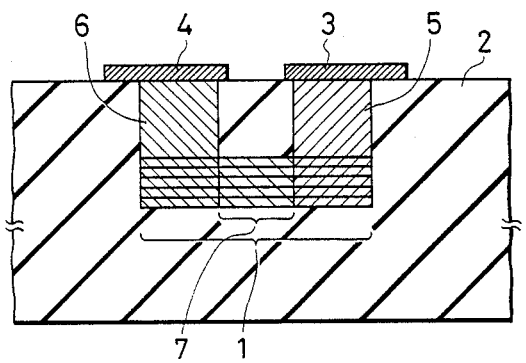
Figure 4:
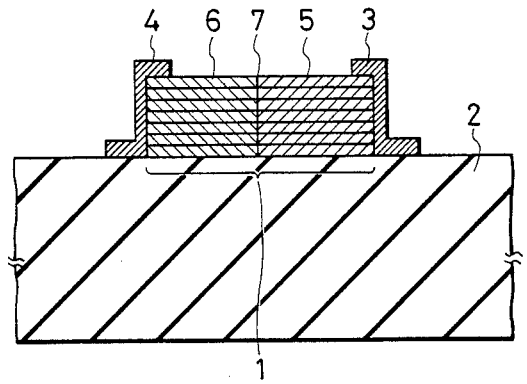

The present invention is also applicable to optical switches having other structures. FIGS. 2 to 4 are sectional views corresponding to FIG. 1b which respectively show optical switches having other structures. In FIGS. 2 to 4, the reference numeral 1 denotes an optical waveguide constituted by a multi-quantum well structure, 2 a semi-insulative substrate, 3 a p-electrode, 3 an n-electrode, 5 a p-region, 6 an n-region, and 7 a carrier injection region serving as a reflection region.

FIG. 2 shows one example of the ridge type optical switch, while FIG. 3 shows one example of the fully buried type optical switch. FIG. 4 shows an optical switch in which a PN junction is provided in the central portion of the intersection of the optical waveguide constituted by a multi-quantum well layer. These optical switches can be produced using known techniques on the basis of the above-described method. In any of these structures, it was possible to obtain excellent switching characteristics, i.e., a switching speed of $10^{-9}$ sec or less, and an extinction ratio of 30 dB at a driving current of 15 mA. In this connection, an extinction ratio in excess of 30 dB could not be obtained in the conventional structure in which carriers were injected perpendicularly to the surface of the MQW even when the driving current was 23 mA.

The optical switches of the present invention which are shown in the above-described embodiments can also be employed as optical modulators. More specifically, if both ends of one of the two intersecting straight waveguides are defined as input and output ends, respectively, the emerging light output can be modulated by modulating the injection current.

Figure 5A:
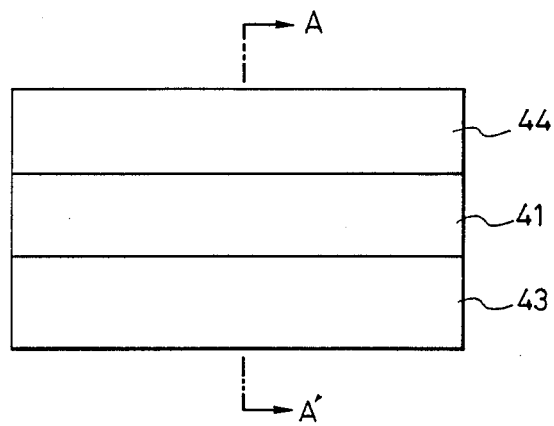
FIG. 5a is a plan view of an optical modulator in accordance with a still further embodiment of the present invention.
Figure 5B:
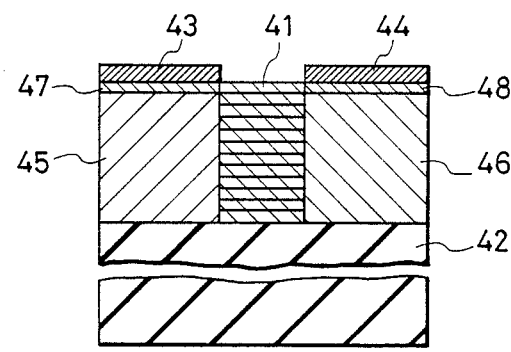
FIG. 5b is a sectional view of the optical modulator shown in FIG. 5a taken along the line A—A'.

Embodiment 2:

This embodiment relates to an optical modulator which is different from the above-described modulator. FIG. 5a is a plan view of the optical modulator in accordance with this embodiment, and FIG. 5b is a sectional view taken along the line A—A' of FIG. 5a.

This optical modulator, which is of the gate type, is composed of a semi-insulative GaAs substrate 42, a GaAs/GaAlAs super lattice (multi-quantum well) waveguide 41, a p-region 45 made of GaAlAs, an n- region 46 made of GaAlAs, and electrodes 43, 44 for the p- and n-regions 45, 46. The length of the device is 500 μm, and the width and thickness of the waveguide 41 are 2 μm each. The GaAs layer and the GaAlAs layer are undoped and have a film thickness of 50 μm. The p- and n-regions 45 and 46 each defined by a GaAlAs layer have a carrier concentration of $1 \times 10^{18}$ cm$^{-3}$. GaAs layers 47 and 48 which have a bandgap wavelength λ of 1.1 μm and a film thickness of 0.2 μm are provided as contact layers for providing contact with the electrodes 43 and 44, respectively. The composition of the above-described GaAlAs is $Ga_{0.6}Al_{0.4}As_{1.0}$.

The process for producing this optical modulator is substantially the same as that for Embodiment 1 except that the configuration of the channel in the waveguide is different from that in Embodiment 1.

When light having a wavelength of 0.8 μm was applied to this optical modulator to measure the extinction ratio, an extinction ratio of 35 dB was obtained at an injection current of 50 mA.

Embodiment 3:

An optical switch was produced which was the same as that in Embodiment 1 shown in FIGS. 1a and 1b except that the total film thickness of the multi-quantum well (MQW) of this optical switch was selected so as to be 5 μm.

With this optical switch, an extinction ratio of 30 dB was obtained when the driving current was 100 mA. It should be noted that, in the case of the prior art having a structure in which carriers were injected perpendicularly to the surface of the MQW, when the total film thickness of the MQW was set at 5 μm, an extinction ratio of only 2 dB was obtained for a driving current of 100 mA.

Although the embodiments of optical switches and optical modulators employing the photo semiconductor device according to the present invention have been described above, the refractive index change portion of the device described in each of the embodiments can also be employed for various other types of photo semiconductor device.

In the above-described plan and sectional views, some of the dimensional ratios of the portions of the devices are made different from the actual ones for the purpose of facilitating the understanding of their structures.

According to the present invention, carriers can be efficiently injected into the multi-quantum well irrespective of the total film thickness of the multi-quantum well layers. It is therefore possible to change the refractive index within the multi-quantum well region uniformly and by a large margin along the direction of thickness of the quantum well structure, and this leads to great improvements in performance of optical switches, optical modulators and the like. As a result, it is possible to realize a photo semiconductor device having a compact size, low power consumption and high extinction ratio.

What is claimed is:

1. In a semiconductor device which has a multi-quantum well structure formed by laminating thin semiconductor layers on a semiconductor substrate and which operates in accordance with changes in refractive index caused by variations in the number of carriers in the region of said multi-quantum well structure, a photo semiconductor device which comprises means for injecting said carriers into said multi-quantum well structure region in a direction parallel to the surface of the laminated thin semiconductor layers constituting said multi-quantum well structure, wherein at least a portion of an optical waveguide provided on said semiconductor substrate has said multi-quantum well structure, and said means for injecting said carriers are provided on both sides, respectively, of that portion of said optical waveguide, so that said portion and said means for injecting said carriers from an optical modulating region.

2. A photo semiconductor device according to claim 1, wherein said substrate is a semi-insulative InP substrate and said multi-quantum well structure is made up of alternating layers of InP and N-InGaAsP.

3. A photo semiconductor device according to claim 1, wherein said substrate is at least one of InP and GaAs.

4. A photo semiconductor device according to claim 3, wherein said substrate is InP and said multi-quantum well structure includes layers of at least one of InP, InGaAs, InGaAsP, InGaAlAs, and InAlAs.

5. A photo semiconductor device according to claim 3, wherein said substrate is GaAs and said multi-quantum well structure includes layers of at least one of GaAlAs and GaAs.

6. A semiconductor device comprising:
an optical waveguide having a multi-quantum well structure region which operates in accordance with changes in refractive index caused by variations in the number of carriers in said multi-quantum well structure; and
means for injecting said carriers into said multi-quantum well structure region in a direction parallel to the surface of layers which make up the multi-quantum well structure region, wherein said means for injecting said carriers are provided on both sides, respectively, of said multi-quantum well region, so that said multi-quantum well region and said means for injecting said carriers form an optical modulating region.

7. A semiconductor device according to claim 6, wherein a substrate of said device is a semi-insulative InP substrate and said multi-quantum well structure region is made up of alternating layers of InP and N-InGaAsP.

8. A semiconductor device according to claim 6, wherein a substrate of said device is at least one of InP and GaAs.

9. A semiconductor device according to claim 8, wherein said substrate in InP and said multi-quantum well structure region includes layers of at least one of InP, InGaAs, InGaAsP, InGaAlAs, and InAlAs.

10. A semiconductor device according to claim 8, wherein said substrate is GaAs and said multi-quantum well structure region includes layers of at least one of GaAlAs and GaAs.

* * * * *